United States Patent
Baker

[15] 3,695,674
[45] Oct. 3, 1972

[54] COMBINATION VEHICLE STABILIZER AND BUG DEFLECTOR

[72] Inventor: William W. Baker, 601 W. Mead, Yakima, Wash. 98901

[22] Filed: Oct. 9, 1970

[21] Appl. No.: 79,521

[52] U.S. Cl..................................296/1 S, 296/91
[51] Int. Cl..........................B60j 1/20, B62d 37/02
[58] Field of Search.....................296/1 S, 91; D14/6

[56] References Cited

UNITED STATES PATENTS

| | | | |
|---|---|---|---|
| 3,596,975 | 8/1971 | Stephen | 296/91 X |
| 2,930,650 | 3/1960 | Vosen | 296/91 X |
| 2,963,315 | 12/1960 | Wilsdorf | 296/91 |
| 3,015,517 | 1/1962 | Thornburgh | 296/91 |
| 3,419,897 | 12/1968 | Bratsberg | 296/91 |
| 3,524,672 | 8/1970 | Rawlings | 296/1 S |

FOREIGN PATENTS OR APPLICATIONS

| | | | |
|---|---|---|---|
| 525,816 | 5/1955 | Italy | 296/91 |
| 1,564,532 | 3/1969 | France | 296/91 |

*Primary Examiner*—Benjamin Hersh
*Assistant Examiner*—Leslie J. Paperner
*Attorney*—Norman H. Huff

[57] ABSTRACT

A blade-like deflector adapted to extend laterally across the front deck lid of vehicles which are comparatively light on the front wheels and subject to wind sway, for example, the "Volkswagen bug." The deflector directs air upwardly and the reaction force produces a downward moment on the front wheels thus stabilizing the steering. The upward flow of deflected air also elevates many air-borne insects and causes them to pass over the vehicle instead of hitting the windshield.

7 Claims, 4 Drawing Figures

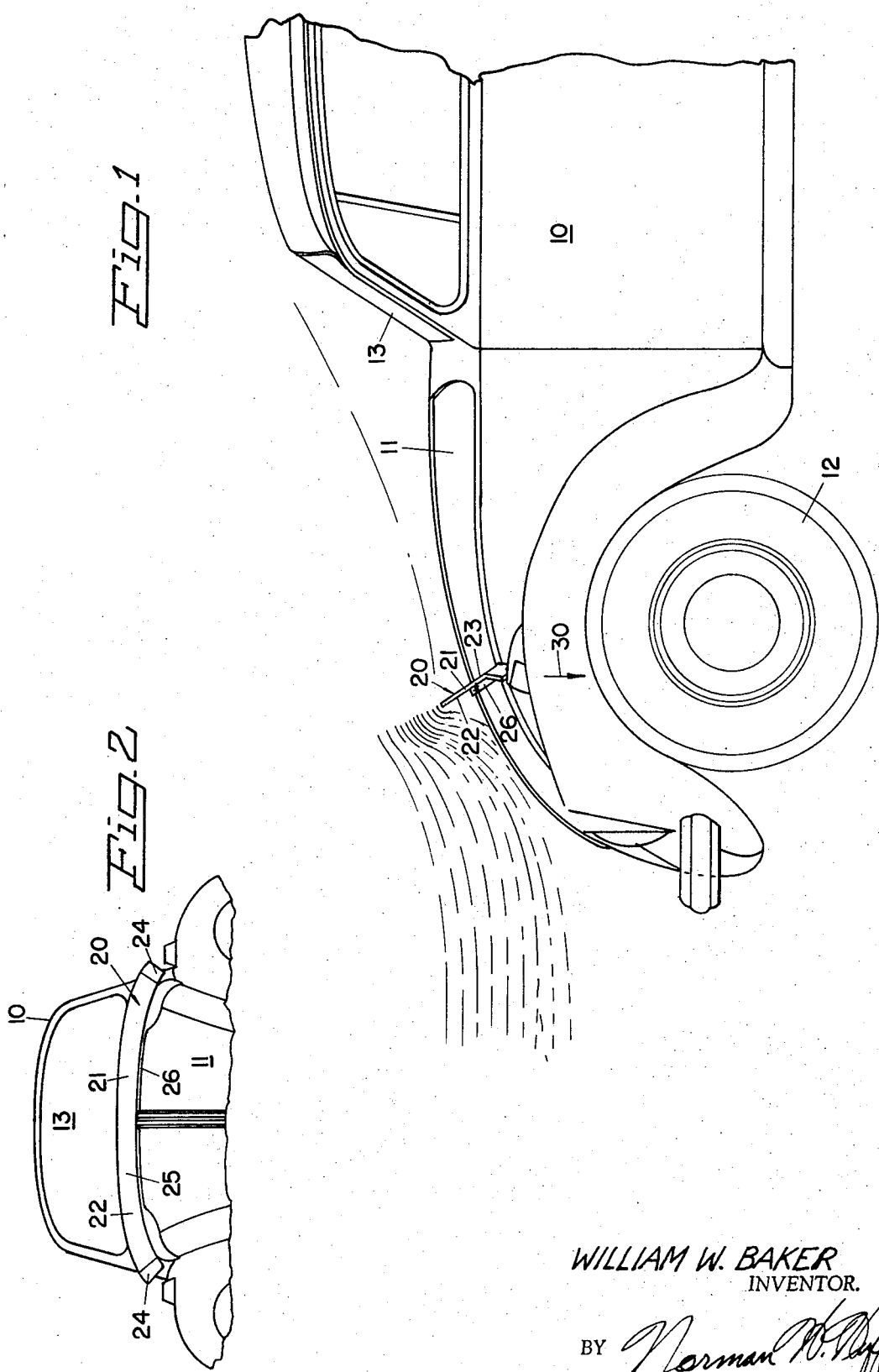

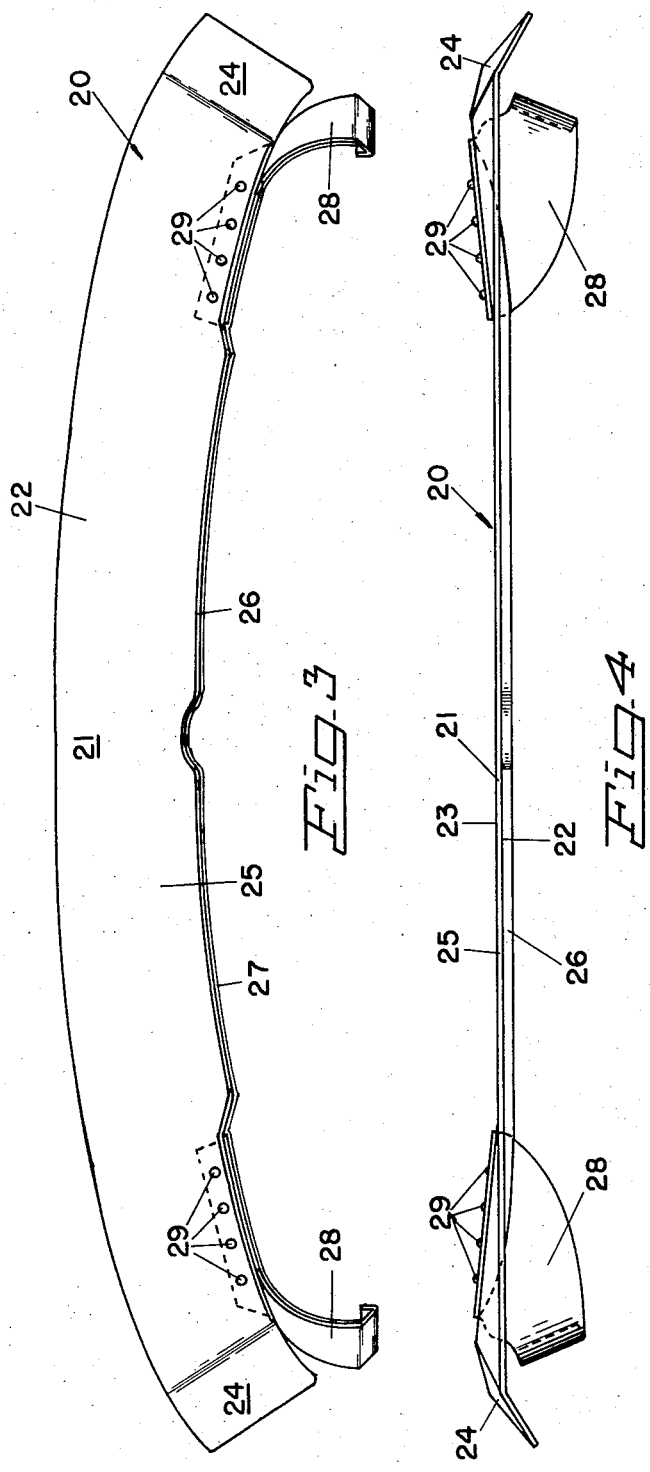

COMBINATION VEHICLE STABILIZER AND BUG DEFLECTOR

My present invention lies in the broad field of automative vehicles and particularly relates to a stabilizing device therefor which also serves to deflect many airborne insects from striking the vehicle windshield.

It is becoming increasingly more popular to assemble automobiles with their engines in the rear. There are also reports that some of the major U. S. manufacturers are designing automobiles with their engines located amidship. These arrangements to remove the weight of the engine from directly over the front steering wheels and thus decrease the resistance to lateral acceleration forces which affects the steering function.

The over-all result is desirable because it helps the automobile to corner well when the excessive weight of the engine is moved rearwardly; but one noticeable detriment is the adverse swaying movements generated when the automobile is subjected to varying cross-wind conditions. This is especially true in the Volkswagen "-bug" having a rear engine and a relatively lightweight front end.

My present invention utilizes the principles of aerodynamics to increase the downward moment upon the front wheels, proportional to the relative movement of the automobile through the air, and thereby render the cross-wind components less capable of accelerating the vehicle laterally. Furthermore, when the cross-wind components are angular from the front quarters, the cross-wind velocity increases the downward moment on the front wheels and further counteracts its tendency to induce sway.

The foregoing and other objects and advantages of the present invention will become more apparent and meaningful during the course of the following specification when considered in association with the accompanying drawings wherein a preferred form of the invention is graphically illustrated. It is to be understood, however, that the drawings are illustrative only and are not intended to limit the scope of the invention. It should also be understood that various changes in construction may be resorted to in the course of manufacture without in any way departing from the spirit of the invention which is to be understood only in accordance with the appended claims. Furthermore, it is to be understood that while the invention is described in one particular association, it is not my intention to unnecessarily limit the applicability of the invention, but I desire to reserve to myself the claimed invention for every use of which it is now know or subsequently discovered to be susceptible.

Other advantages and features of this invention will become apparent from the more detailed description following on which like reference numerals are employed to designate similar parts in the accompanying drawings, wherein:

FIG. 1 is a side elevation of the front end portion of a Volkswagen "bug" having my present invention attached thereto;

FIG. 2 is a fragmentary front elevation of the same at about one-half scale;

FIG. 3 is a front elevation of my deflector at an enlarged scale; and

FIG. 4 is a top view of the deflector.

Refering now in detail to the accompany drawings, I have shown a popular automobile 10 which, it will be understood, has its engine (not shown) operably located at the rear or amidship; that is to say, the engine is not located in the front portion of the automobile. It is therefore clearly understood that the front end is comparatively light-weight, when compared with conventional front-engined automobiles. The automobile 10 has a deck lid 11 disposed vertically above the front steering wheels 12—12 and forwardly of the windshield 13. Conventionally, the deck lid 11 is hinged to provide a closure for a storage area (not shown) but this feature is irrelevant to the present invention.

The stabilizer/deflector is identified by the reference numeral 20 and comprises a substantially flat blade 21 having front and rear flat faces 22 and 23. The blade 21 is shaped transversely of its length to conform substantially to the lateral configuration of the vehicle deck lid 11 with which it is adapted to interfit.

At each end, the blade 21 has a forwardly angled ear 24—24 disposed at an obtuse angle with respect to the flats 22 and 23 of the blade 21. The central section 25 of the blade 21 extends substantially the same distance as the lateral dimension of the vehicle's windshield 13 and the ears 24—24 extend beyond this.

Along its lower edge, the central section 25 of the blade 21 has a forwardly directed perpendicular lip 26 which provides an increased area of contact upon the deck lid 11 surface. Rubber, felt or other protective strip 27 is adhesively secured along the lower face of the lip 26 to protect the finish of the automobile. As seen in FIG. 3, the lower edge of the blade 21 and the lip 26 are shaped to conform to the deck lid configuration and this distribute the forces, to be described, evenly across the automobile surface.

Adjacent to the ears 24—24, brackets 28—28 are secured as by rivets 29—29 and are shaped to fit over the lateral edges of the deck lid 11 to dispose the stabilizer/deflector causes the air to deflect upwardly at a greater rate than normal at a point above the wheels 12 and the reaction force indicated by arrow 30 applies pressure to the wheels to increase the effectiveness of the steering and decrease the tendency of the tires to scuff when side loads are applied. This reaction force is preferably disposed at or forwardly of the steering wheel axes, though it may be disposed rearwardly thereof with less efficient results wherein a portion of reaction force may be carried to the rear wheels.

As the air is deflected upwardly by the stabilizer/deflector 20, air-borne insects are also deflected upwardly and those of relatively light-weight constitution are thus caused to pass over the top of the automobile instead of striking the windshield.

The forwardly directed ears serve to scoop and contain air for upward deflection and thus minimize that which may escape laterally. Obviously, this scooping action enhances the deflection and thus increases the downward moment upon the wheels.

Having thus described my invention, I desire to secure by Letters Patent of the United States the following:

1. In combination with a vehicle having a comparatively light weight front end including a deck lid disposing vertically above the front steering wheels and forwardly of the windshield, the improvement of a vehicle stabilizer and bug deflector, comprising:
- a blade fixed with respect to and extending laterally of said vehicle upon said deck lid and projecting substantially perpendicularly into the air stream created during forward movement of said vehicle and constructed and arranged to apply the reaction force of upwardly directed air as a downward moment upon said steering wheels; and
- said blade is disposed forwardly of the axes of said steering wheels at a selected location rearwardly of the front peripheral edges of said steering wheels.

2. The invention disclosed in claim 1, wherein:
said blade comprises:
- a flat central section of a length substantially equal to the lateral dimension of the vehicle's windshield; and
- an ear at each end of said central section and angled forwardly at an obtuse angle.

3. The invention disclosed in claim 1, wherein:
said blade comprises:
- a flat central section of a length substantially equal to the lateral dimension of the vehicle's windshield; and
- an ear at each end of said central section and angled forwardly at an obtuse angle.

4. The invention disclosed in claim 3, wherein:
said blade has a right angle lip along its lower marginal edge shaped for face to face engagement with said deck lid, whereby to distribute the reaction force over a greatly enlarged area of said deck.

5. The invention disclosed in claim 4, wherein:
a resilient cushion is carried by the under side of said lip to protect the finish of said vehicle.

6. The invention disclosed in claim 4, wherein:
flanges are secured to said lip, one adjacent each end and are constructed and arranged to releasably interact with the side edges of said deck lid and to form means for fixing the blade with respect to said vehicle.

7. The invention disclosed in claim 6, wherein:
a resilient cushion is carried by the under sides of said lip and said flanges to protect the finish of said vehicle.

* * * * *